(12) United States Patent
Anderson et al.

(10) Patent No.: US 10,138,067 B2
(45) Date of Patent: Nov. 27, 2018

(54) JACKLADDER FLIGHT MEMBER WITH REPLACEABLE OR ROTATABLE WEAR COMPONENT

(71) Applicant: CRUCIBLE, LLC, Birmingham, AL (US)

(72) Inventors: Gary W. Anderson, Leeds, AL (US); Grady W. Covin, Wilsonville, AL (US)

(73) Assignee: CRUCIBLE, LLC, Birmingham, AL (US)

( * ) Notice: Subject to any disclaimer, the term of this patent is extended or adjusted under 35 U.S.C. 154(b) by 0 days.

(21) Appl. No.: 15/239,549

(22) Filed: Aug. 17, 2016

(65) Prior Publication Data

US 2018/0050871 A1    Feb. 22, 2018

(51) Int. Cl.
| | | |
|---|---|---|
| *B65G 19/00* | (2006.01) | |
| *B65G 19/22* | (2006.01) | |
| *B65G 19/24* | (2006.01) | |
| *B65G 19/08* | (2006.01) | |

(52) U.S. Cl.
CPC ............ *B65G 19/22* (2013.01); *B65G 19/08* (2013.01); *B65G 2207/48* (2013.01)

(58) Field of Classification Search
None
See application file for complete search history.

(56) References Cited

U.S. PATENT DOCUMENTS

| | | | | | |
|---|---|---|---|---|---|
| 3,712,456 | A | * | 1/1973 | Kincaid | B65G 19/08 198/692 |
| 4,327,828 | A | * | 5/1982 | Williams | B65G 19/22 119/57.2 |
| 5,165,522 | A | * | 11/1992 | Uttke | B01D 21/18 198/716 |
| 5,799,780 | A | * | 9/1998 | Steeb, Jr. | B65G 15/62 198/823 |
| 8,162,131 | B2 | * | 4/2012 | Perry | B65G 19/10 198/731 |

* cited by examiner

*Primary Examiner* — Kavel Singh
(74) *Attorney, Agent, or Firm* — David G. Rosenbaum; Benjamin D. Rotman; Rosenbaum IP, P.C.

(57) ABSTRACT

The present invention is a jackladder flight member with replaceable or rotatable wear surfaces. Additional embodiments of the invention include a jackladder conveyer chain comprising flight members with replaceable and rotatable wear surfaces as well as a jackladder conveyer system comprising a jackladder chain comprising flight members with replaceable or rotatable wear surfaces and a method to replace or rotate or replace the replaceable or rotatable wear surfaces.

18 Claims, 7 Drawing Sheets

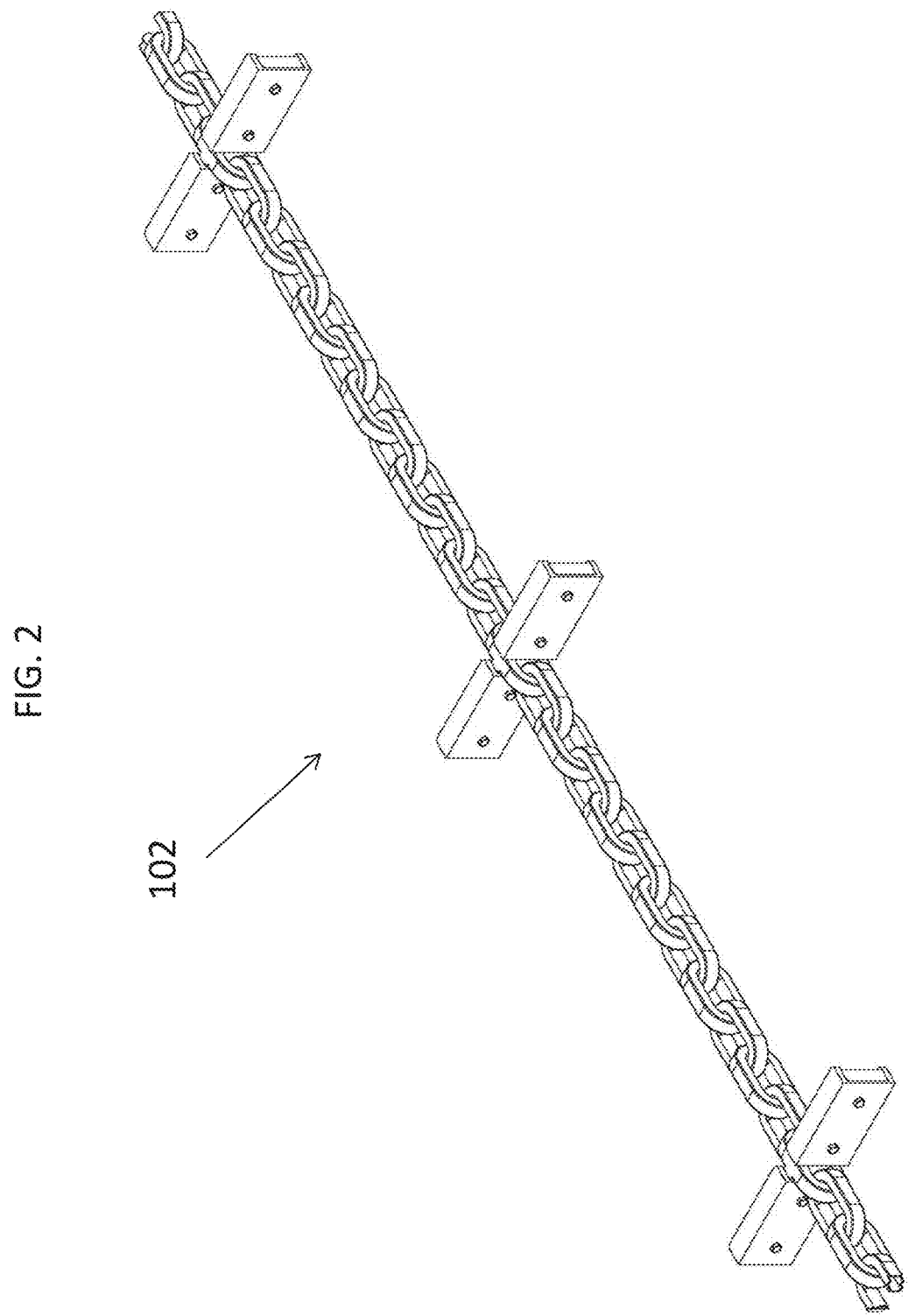

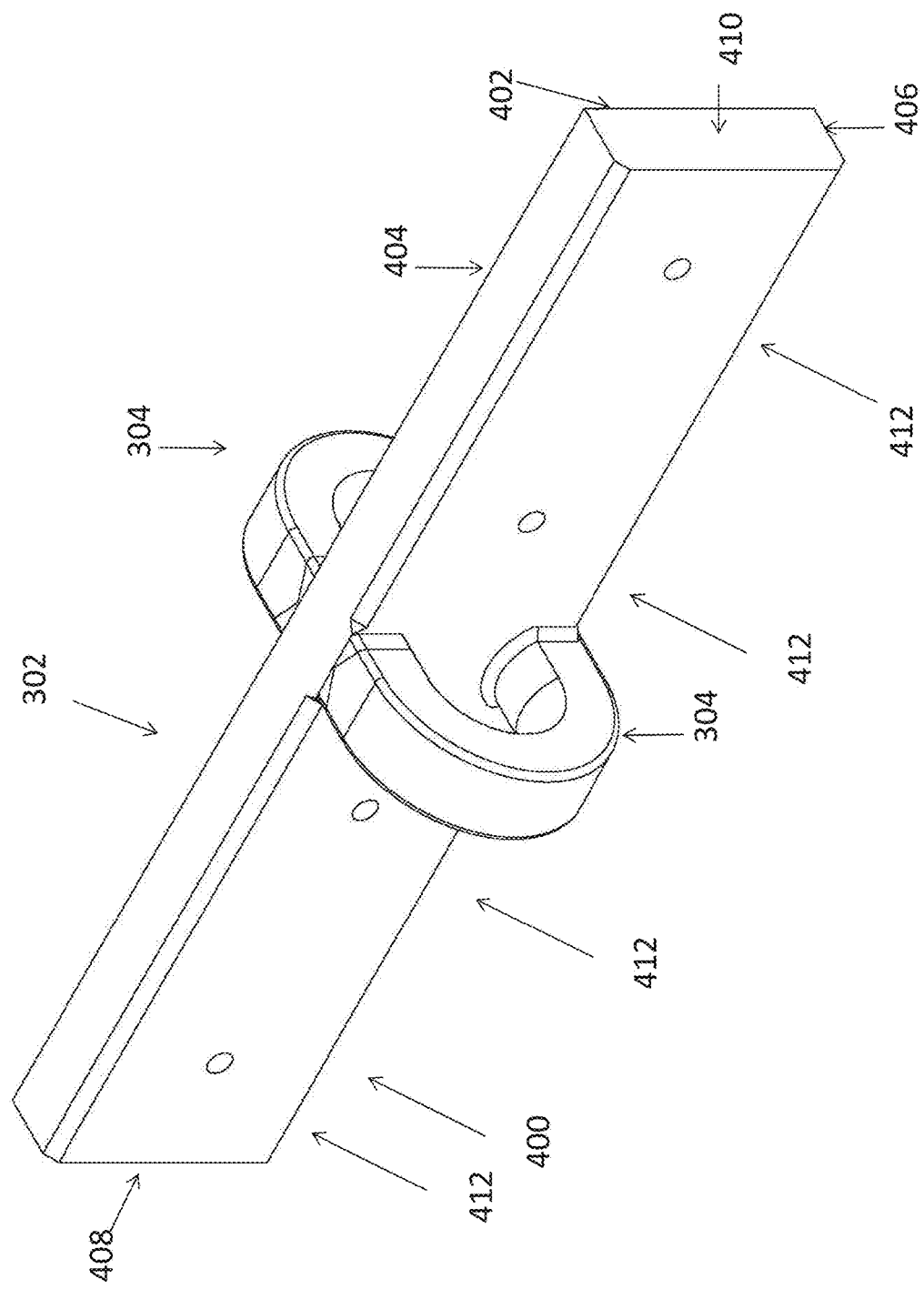

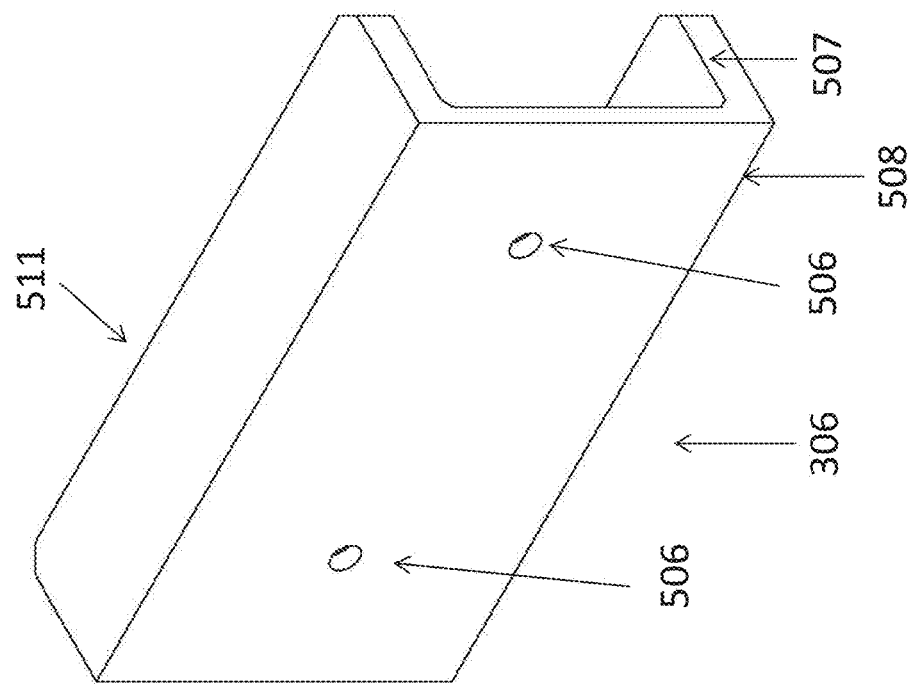
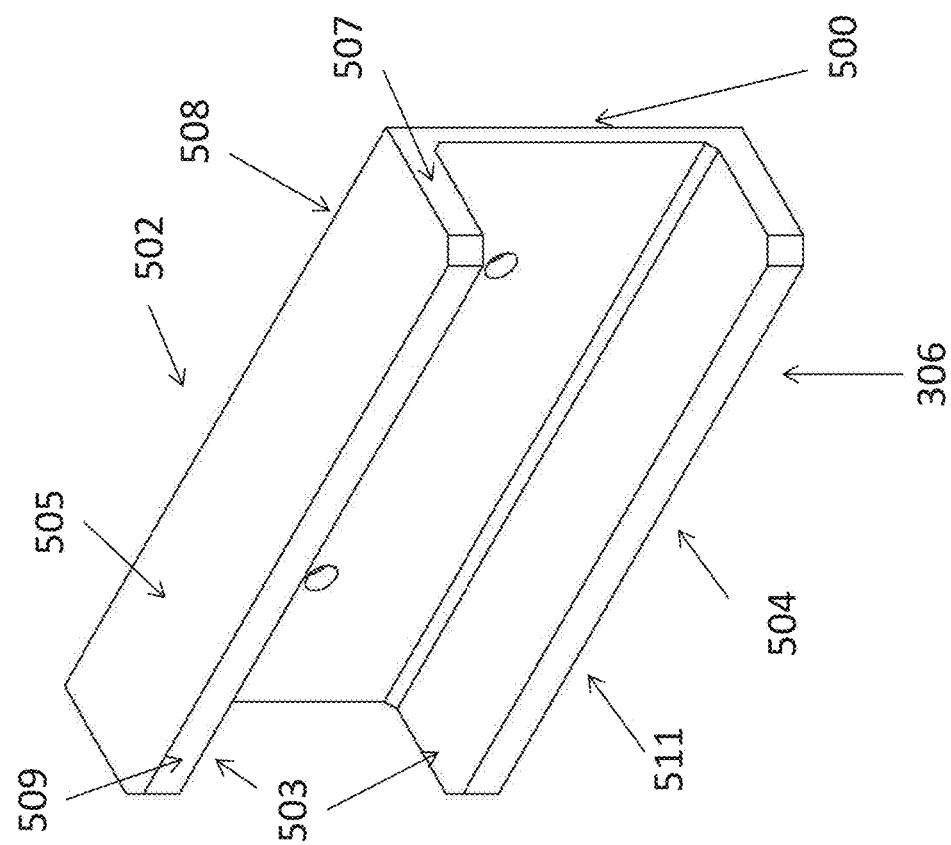

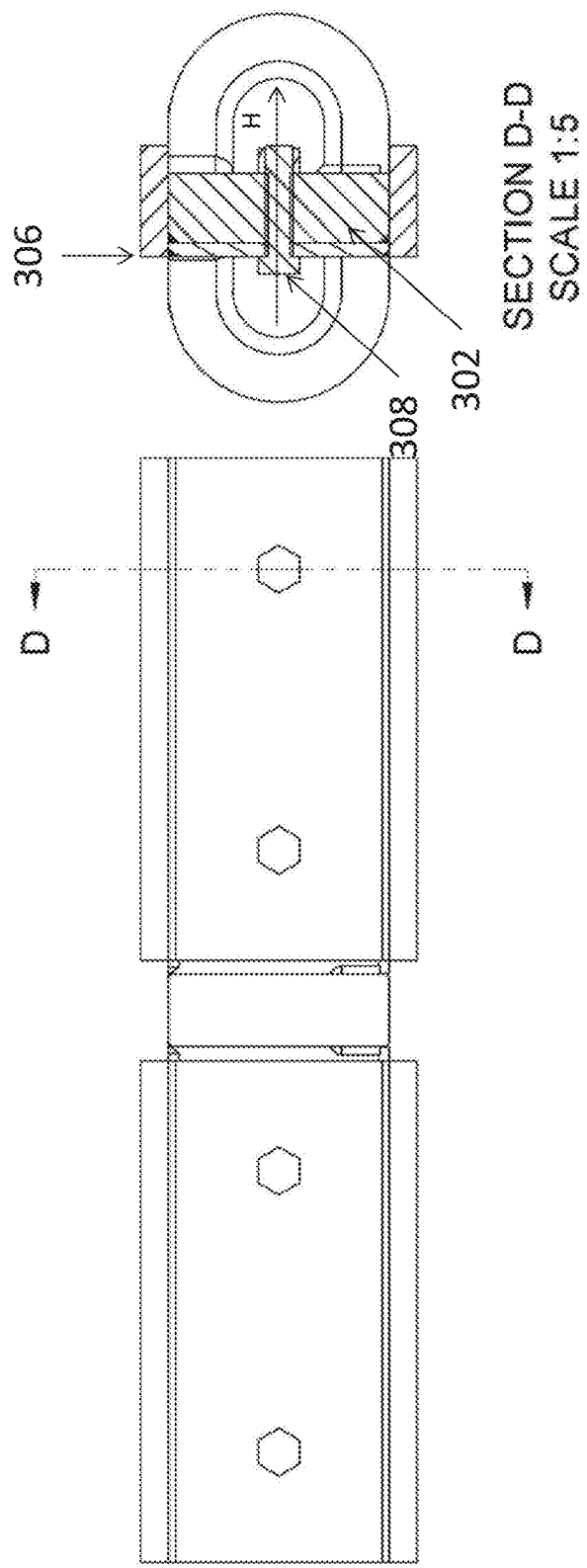

JACKLADDER FLIGHT MEMBER WITH REPLACEABLE OR ROTATABLE WEAR COMPONENT

BACKGROUND OF THE INVENTION

The present invention pertains generally to the field of jackladder conveyer systems used in the logging industry. Jackladder conveyer systems are used to move logs into a chipper or sawmill. More particularly, this invention relates to the construction of the elements used within the jackladder system to move the logs up an incline known as "flights." Flights are elongated members that are interconnected by a conveyer chain and run normal to the direction of the chain. As the conveyer chain traverses the incline of the system, the flights act to carry the logs up the incline and into a chipper or sawmill.

As indicated in U.S. Pat. No. 5,441,092, a typical softwood log sawmill comprises saws installed on an upper deck, while ancillary equipment is installed at ground level. A sloping conveyor (the "jackladder") brings up a continuous supply of logs from a log pond or storage yard to the upper deck where the saw is installed. The jackladder conveyer system typically comprises an inclined plane, a conveyer chain that moves up the incline plane and cycles back down to the ground level where the log supply is located. The conveyer chain is comprised of chain links with flight members spaced at even intervals throughout the length of the chain. The flight members create troughs to carry logs up the conveyer and prevent the logs from falling down the incline by acting as steps and barriers to support the logs as the chain moves up the incline.

Flight members in the prior art have been constructed of hardened steel alloys and may have additional wear plate overlays welded to the original cast flight. In a jackladder conveyer system, the flight member is typically the first to fail due to wear generated by the forces acted on it by the logs being loaded into the conveyer and the frictional forces against the inclined plane.

Traditionally in the prior art when a flight member would fail due to wear, the entire conveyer system would be brought to a halt while the entire chain was replaced, or an individual flight member was replaced. Currently, the individual flight member is replaced by removing and adding new chain links, or the flight is repaired and reinforced with a new welded overlay. The failure of a flight member creates significant down time for the system.

The present invention addresses the reparability and replaceability of jackladder flight members by adding replaceable and rotatable wear surfaces. The wear surfaces can be harder materials that are more durable than the original flight member by itself, and when the wear surfaces degrade, they can be replaced.

SUMMARY OF THE INVENTION

The present invention relates to an individual flight member of a jackladder conveyer system with replaceable and rotatable wear surface components. A jackladder flight member assembly comprising replaceable and rotatable wear surface or wear plate components is especially suitable for quickly and easily replacing the area of the flight member that wears down and fails the fastest. The flight member appears as a standard flight member but comprises wear surfaces covered by an additional removable wear plate component that can be replaced when worn to the point of failure or pre-failure.

One advantage of the present assembly is that the worn wear plate component can be quickly removed and replaced mechanically with standard fasteners or bolts instead of being repaired or replaced through a more time consuming and more costly welding process, chain flight replacement or even complete chain replacement.

An additional advantage is that replacing just the wear plate component preserves the rest of the flight member that has not worn to the point of necessitating replacement. This increases the overall life of the each flight member.

Another advantage of the present assembly is that the wear plate component can be made of a different material that may handle wear better than the rest of the flight member depending on particular application. This may increase overall wear life and decrease the cost of what it may have been to cast a flight member in a single alloy.

BRIEF DESCRIPTION OF THE DRAWINGS

In the accompanying figures, like elements are identified by like reference numerals among the several preferred embodiments of the present invention.

FIG. 2 is an isometric view of flight member assemblies interconnected by a jackladder conveyer.

FIG. 4 is an isometric view of the base component of the flight member assembly.

FIG. 5A is a front perspective view of the wear plate component of the flight member assembly.

FIG. 5B is a rear perspective view of the wear plate component of the flight member assembly.

FIG. 6 is a horizontal cross-section view of the flight member assembly through the axis of the first bolt hole.

DETAILED DESCRIPTION OF THE PREFERRED EMBODIMENTS

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Figure 1:
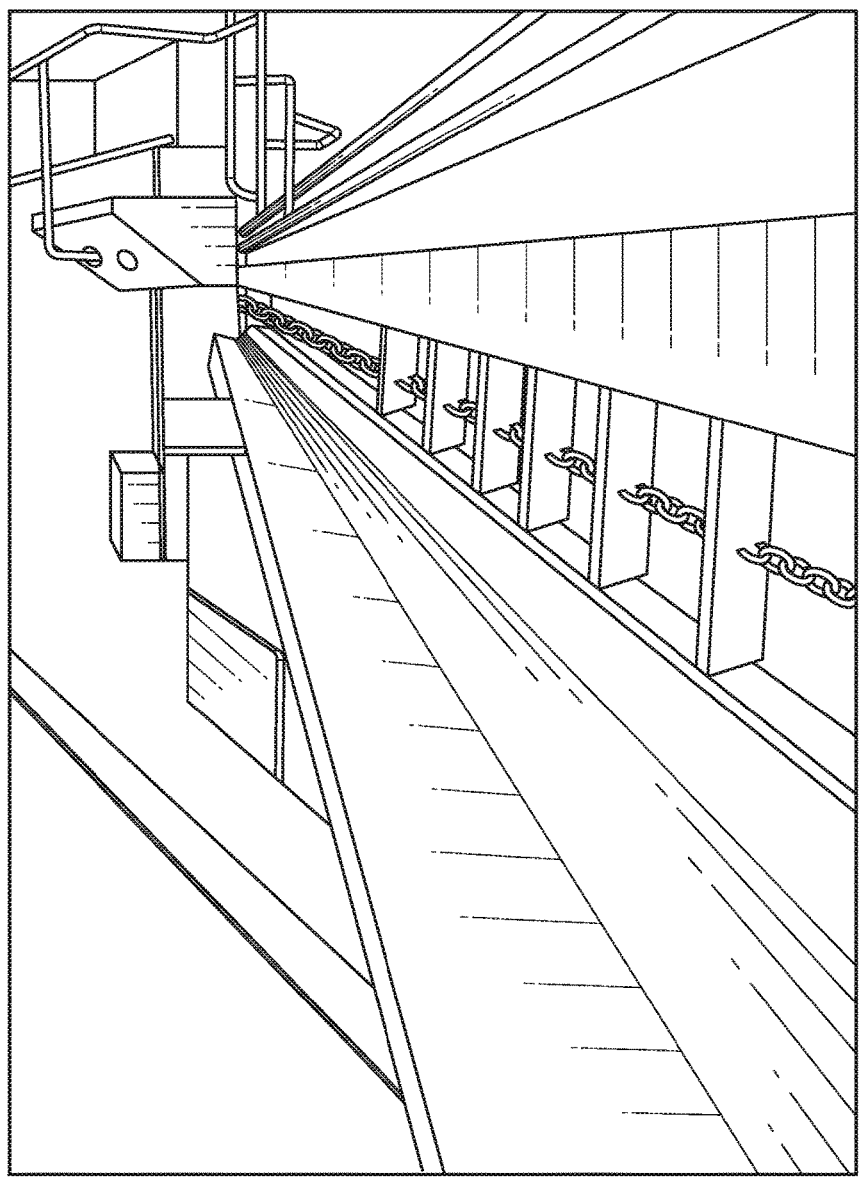
FIG. 1 is an example view of a jackladder conveyer system with flight member assemblies disposed as the flights.

With specific reference to the drawings, FIG. 1 represents a jackladder conveyer system 100, comprising a loading trough, a ramp, a jackladder chain assembly 102, a second trough, and logs. The jackladder chain assembly 102 is further detailed in FIG. 2 which displays individual flight member assemblies interconnected by a chain.

Figure 3A:
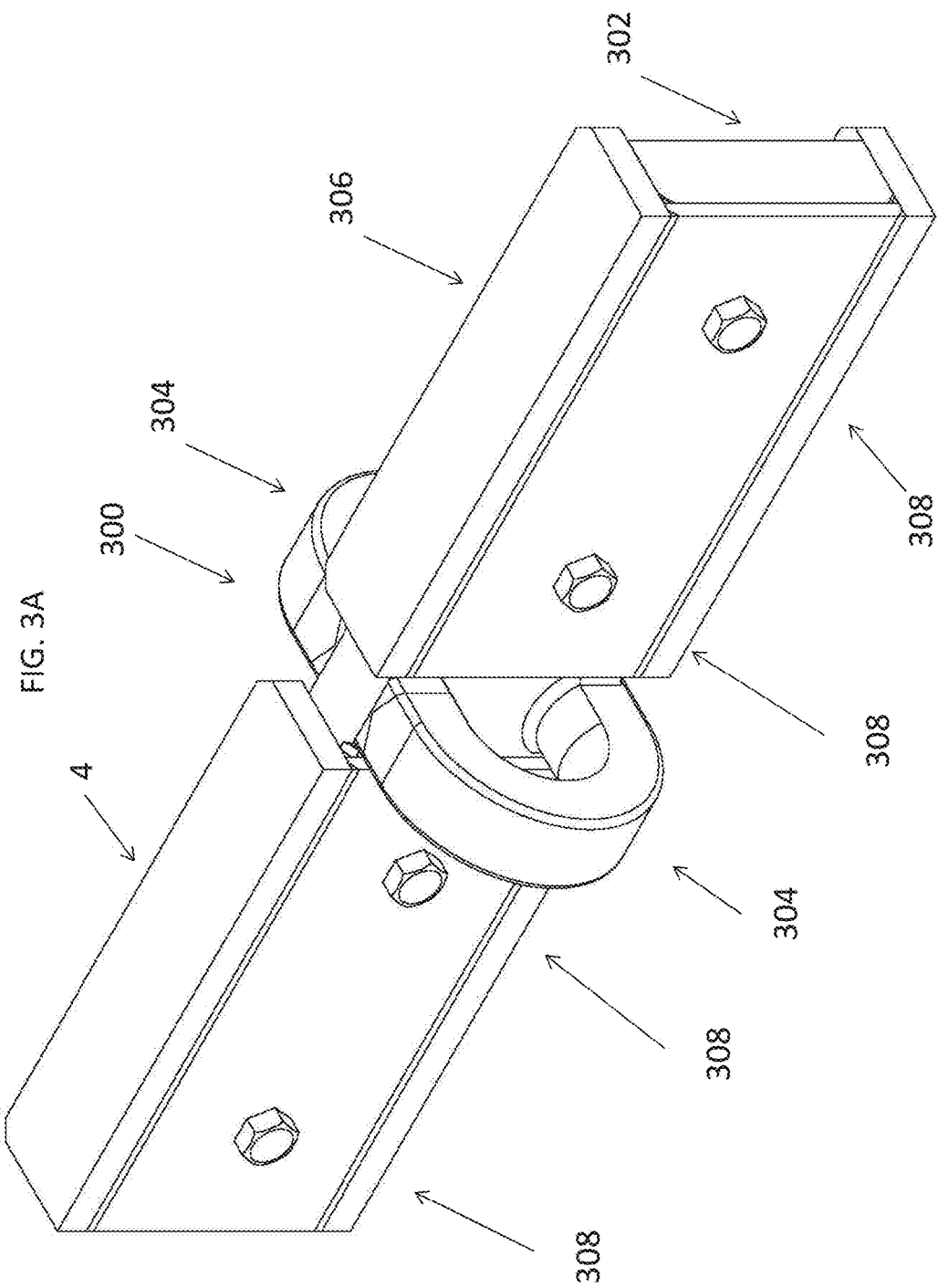
FIG. 3A is an isometric view of a flight member assembly.
Figure 3B:
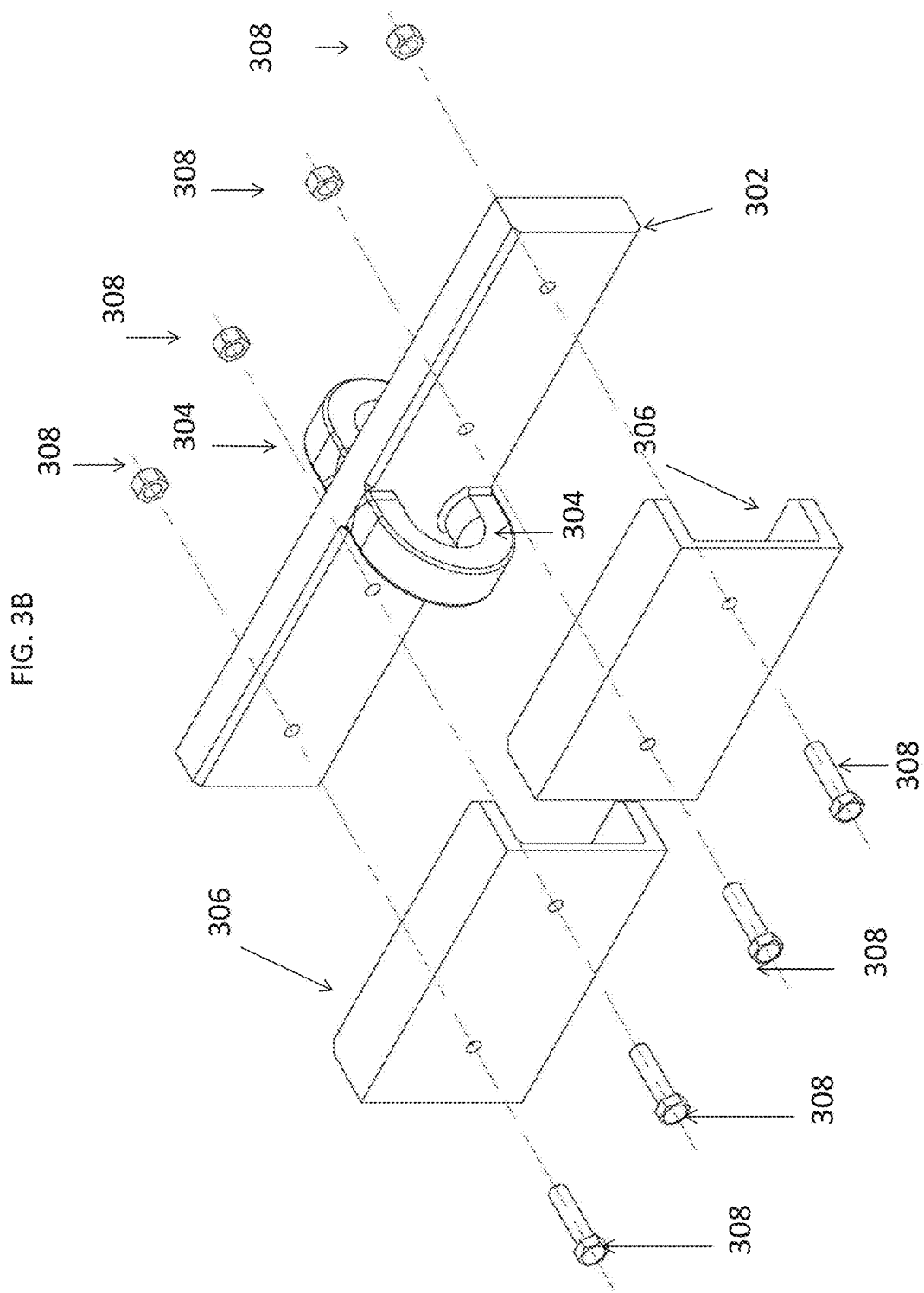
FIG. 3B is an isometric exploded view of a flight member assembly.

FIGS. 3A and 3B represent an embodiment of the flight member assembly 300. FIG. 3A an isometric view of the flight member assembly 300 comprising a base plate 302, chain link connector 304, wear plate components 306, wear plate coupling means 308. FIG. 3B is an isometric exploded view of the flight member assembly 300 also displaying the base plate 302, chain link connector 304, wear plate components 306, wear plate coupling means 308.

FIG. 4 is an isometric view of the base plate 302 of the flight member assembly 300. The base plate 302 is generally a rectangular prism with six surfaces. The base plate comprises a front surface 400, back surface 402, a top surface 404, a bottom surface 406, a left surface 408, and a right surface 410. The base plate additionally comprises chain link connector 304 integrally coupled to the front surface 400, and the back surface 402. In order to couple the wear plate component 306 to the base plate 302, this particular embodiment also comprises holes 412 to accommodate a wear plate coupling means 308. The wear plate coupling means 308 in some embodiments may include a set of bolts fastened by nuts. Other examples of wear plate coupling means include, but are not limited to, elongated threated members extending from an inner surface of the wear plate component 306 configured to align to and extend through the holes 412 of the base plate and fastened with nuts, or the wear plate component 306 and base plate 302 including a countersink portion of the front surface and rear surface to allow the set of bolts to extend through the wear plate component 306 and holes 412 and be fastened with a nut while protected from outside force.

In one embodiment shown in FIG. 4, a chain link connector 304 is centered horizontally along the front 400 and back 402 surfaces respectively. This configuration is designed for base plate log sizes that can utilize a single chain to withstand log forces traversing up the conveyer system. In an alternative configuration, at least one chain link connector 304 or a plurality of chain link connectors 304 may be spaced along the front 400 and back 402 surfaces to meet the particular force requirements needed by the system. For example, two chain link connectors 304 may be used and coupled on the ends of the front 400 and back 402 surfaces to accommodate two chains and a greater lifting force. In the embodiments represented in FIGS. 3A-3B, the chain link connector 304 is centrally located dividing the base plate 302 into two sides. In this embodiment, the wear plate components 306 may be disposed on opposite adjacent sides of the chain link connector 304. In other embodiments, a single wear plate component 306 may be disposed on either side of the chain link connector 304 or the single wear plate component 306 may have a portion removed such that it may accommodate the chain link connector 304.

FIG. 5A is a front perspective view of the wear plate component 306 of the flight member assembly 300, while FIG. 5B is a rear perspective view of the wear plate component of the flight member assembly. The wear plate component 306 is designed to at least partially cover a portion of the areas or surfaces of the base plate 302 that are subject to the most wear in the operation of a jackladder conveyer system. In the particular embodiment in FIGS. 5A and 5B, the wear plate component 306 comprises a general C-shaped transverse cross-section which is a horizontal symmetric transverse cross section with a front surface plate 500, a top flange plate 502, and a bottom flange plate 504. The top flange plate 502 and a bottom flange plate 504 further comprise an inner surface 503, an outer surface 505, side surfaces 507, and rear surface 509. In order to couple the base plate 302, this particular embodiment also comprises holes 506 to accommodate a wear plate coupling means 308 such as a nut and bolt combination. In this embodiment, the symmetric C-shaped cross-section allows the wear plate component 306 to be removed from the flight member assembly 300 at its zero degree rotation position and rotated one hundred eighty degrees and coupled back to the base plate 302. Having a symmetric shaped cross-section allows for the user to maximize the life cycle of the assembly by wearing the wear plate component 306 evenly on both top 502 and bottom 504 flange plates. In some embodiments the leading edge 508 where the front surface of the of the wear plate component 306 meets the outer surface 505 of the top flange plate 502 or the outer surface 505 of the bottom flange plate 504 is rounded or chamfered instead of a sharp ninety degrees. Additionally in some embodiments the trailing edge 511 where the outer surface 505 of the top or bottom flange plates meets the rear surface 509 of the top or bottom flange plates of the wear plate component 306 is rounded or chamfered instead of a sharp ninety degrees. Rounded leading edges and trailing edges lead to less damage to the inclined plane from impact and frictional forces of the moving jackladder flight.

In most common jackladder conveyer system applications in the logging industry, the bottom surface 406 of the base plate 302 wears the fastest due to the frictional forces of the plates on the incline while traversing up the incline. Wear and other forces on the base plate are also seen due to the impact of logs being loaded onto the conveyer. The C-shaped cross section design of the wear plate component member allows for wear resistant or impact abrasion resistant metal materials, including but not limited to, alloy wear plate, chromium carbide, tungsten carbide, or white iron chrome to be used for top flange plate 502 or top flange plate overlay and bottom flange plate 504 or bottom flange plate overlay while a cheaper more common steel alloy like A36 to be used for the front surface plate 500 and the base plate 302. In alternative embodiments, the wear plate component 306 or a wear plate component overlay and the base plate 302 may be comprised of either the same material as each other or different material than each other. In other embodiments, the wear plate component 306 or a wear plate component overlay may be entirely comprised of impact abrasion resistant metal.

FIG. 6 is cross-sectional view (Section D-D) of the flight member assembly 300 displaying a wear plate component 306 coupled to the base plate 302 via the wear plate couplings means 308 along with depicting horizontal coupling means axis H. In this particular embodiment, the wear plate couplings means 308 is represented by a bolt running through both the wear plate component 306 and base plate 302 and fastened with a nut. This embodiment also displays the wear plate component 306 completely covering what would traditionally be all exposed wear surfaces of the base plate 302.

In an additional embodiment of the invention, a method for repairing or replacing wear plate components 306 is contemplated. The method includes the steps of examining the wear plate component 306 for failure or near failure, uncoupling the wear plate component 306 from the base plate 302 and rotating the wear plate component 306 180 degrees about axis H and recoupling the wear plate component 306 to the base plate 302. This step allows for even wear on both top and bottom surfaces of the wear plate component 306. If both surfaces are already worn to failure or near failure, then a new wear plate component 306 is coupled to the base plate 302 to replace the worn wear plate component 306.

While the invention has been described in connection with various embodiments, it will be understood that the invention is capable of further modifications. This application is intended to cover any variations, uses or adaptations of the invention following, in general, the principles of the invention, and including such departures from the present disclosure as within the known and customary practice within the art to which the invention pertains.

What is claimed:

1. A jackladder flight member assembly comprising:
   a) a base plate having a front surface, a rear surface, a top surface and a bottom surface;
   b) at least one chain link connector coupled to the base plate;
   c) at least one wear plate component wherein the wear plate component comprises a horizontal symmetric transverse cross section and is further configured to be coupled to the base plate at a zero degree rotation position and a one hundred eighty degree rotation position relative to a coupling means axis and wherein the transverse cross section of the wear plate component is generally C-shaped having a front surface plate, a top flange plate, and a bottom flange plate; and
   d) the at least one wear plate component removably coupled to the base plate covering at least a portion of the front surface, top surface, and bottom surface of the base plate.

2. The jackladder flight member assembly of claim 1, wherein the at least one chain link connector is coupled to the front surface of the base plate and is centrally located on the front surface and a second chain link connector is coupled to a back surface of the base plate and is centrally located on the back surface.

3. The jackladder flight member assembly of claim 2, wherein the at least one wear plate component and a second wear plate component are removably coupled to the base plate.

4. The jackladder flight member assembly of claim 3 wherein the at least one wear plate component and the second wear plate component are coupled to the front surface of the base plate and disposed on opposite adjacent sides of the chain link connector.

5. The jackladder flight member assembly of claim 1, wherein the at least one wear plate component is coupled to the base plate by at least one bolt that runs through both the wear plate component and the base plate and is further secured to the base plate through a fastener.

6. The jackladder flight member assembly of claim 5, wherein a front surface of the wear plate component further comprises a countersink and the at least one bolt is disposed within the countersink flush with or sub flush to the front surface.

7. The jackladder flight member assembly of claim 5, wherein the rear surface of the base plate further comprises a countersink and the at least one bolt and fastener are disposed within the countersink flush with or sub flush to the rear surface.

8. The jackladder flight member assembly of claim 1, wherein the at least one wear plate component is coupled to the base plate through at least one elongated member extending from an inner surface of the wear plate component and is further secured to the base plate through a fastener.

9. The jackladder flight member assembly of claim 8, wherein the rear surface of the base plate further comprises a countersink and the at least one elongated member extending from the inner surface of the wear plate component and fastener are disposed within the countersink flush with or sub flush the rear surface.

10. The jackladder flight member assembly of claim 1, wherein the wear plate component comprises a different material than the base plate.

11. The jackladder flight member assembly of claim 1, wherein the wear plate component or a wear plate component overlay is comprised of impact abrasion resistant metal or steel.

12. The jackladder flight member assembly of claim 1, wherein the front surface plate is comprised of a different material than the top flange plate or a top flange plate overlay and the bottom flange plate or a bottom flange plate overlay.

13. The jackladder flight member assembly of claim 12, wherein the top flange plate and bottom flange plate or an overlay of the top flange plate and bottom flange plate are comprised of impact abrasion resistant metal or steel.

14. The jackladder flight member assembly of claim 1, wherein the front surface plate and the top flange plate or the front surface plate and the bottom flange plate join to form a rounded or chamfered leading edge, further wherein the top flange plate and the bottom flange plate have a rounded or chamfered trailing edge.

15. The jackladder flight member assembly of claim 1 wherein the wear plate component further comprises a rear surface plate coupled opposite the front surface plate to the top surface flange and the bottom surface flange, further wherein the wear plate component covers at least a portion of the front surface, top surface, bottom surface, and rear surface of the base plate.

16. A jackladder conveyer system with removable flight member wear components comprising:
   a) an inclined plane;
   b) at least one conveyer chain comprising at least one flight member assembly coupled to the conveyer chain; and
   c) the at least one flight member assembly comprising a base plate having a front surface, a rear surface, a top surface and a bottom surface, at least one chain link connector coupled to the base plate, at least one wear plate component wherein the wear plate component comprises a horizontal symmetric transverse cross section and is further configured to be coupled to the base plate at a zero degree rotation position and a one hundred eighty degree rotation position relative to a coupling means axis and wherein the transverse cross section of the wear plate component is generally C-shaped having a front surface plate, a top flange plate, and a bottom flange plate, the at least one wear plate component removably coupled to the base plate covering at least a portion of the front surface, top surface, and bottom surface of the base plate.

17. The jackladder conveyer system of claim 16, wherein the at least one conveyer chain is comprised of at least two flight member assemblies and the flight member assemblies are interconnected by the conveyer chain through the chain link connector of each respective flight member assembly.

18. The jackladder conveyer system of claim 16 wherein the wear plate component further comprises a rear surface plate coupled opposite the front surface plate to the top surface flange and the bottom surface flange, further wherein the wear plate component covers at least a portion of the front surface, top surface, bottom surface, and rear surface of the base plate.

* * * * *